Patented Dec. 15, 1953

2,662,855

UNITED STATES PATENT OFFICE 2,662,855

MICROBIOCIDAL TREATMENT OF WATER WITH BROMINE CHLORIDE

Jonas Kamlet, New York, N. Y.

No Drawing. Application September 7, 1950, Serial No. 183,680

3 Claims. (Cl. 210—28)

This invention relates to products suitable for the disinfection and sterilization of water and to the process of employing the same. More particularly, it relates to products suitable for the disinfection and sterilization of potable, industrial, agricultural and horticultural, military, hygienic and recreational water supplies and to the process for employing the same. It has for its purpose to provide an inexpensive, easily preparable group of products which can be added, in minimal amounts, to water supplies intended for use by municipalities, urban and suburban areas, in cooling towers, air-conditioning systems, on the farm and ranch, in the factory, in civilian and military hospitals and dispensaries, in camps, for swimming pools, baths and aquaria, waterworks, wells, reservoirs, by fire-fighting agencies, on maritime and naval vessels, in boilers, steam generators and locomotives, in pulp and paper mills, for irrigation and drainage, for sewage and waste disposal, in the textile industry, in the chemical industries, in the tanning industry, et cetera, and which will render said water supplies bactericidal, fungicidal and algaecidal. It has for its further purpose to provide a simple process whereby water supplies, for whatever purposes intended, are rendered bacteriostatic, fungistatic and algaestatic, i. e. said water supplies treated by the process of this invention will resist and inhibit the further growth or proliferation of bacteria, fungi, algae and all forms of microbian life therein. Other and ancillary purposes of the present invention will become evident in the course of my description thereof.

The use of the halogens chlorine and bromine, individually, in the disinfection and sterilization of water supplies intended for diverse purposes is old and very well known in the art. Since the introduction for this purpose of bleaching powder (calcium hypochlorite) about 1900, and of liquid chlorine about 1912, the chlorination of municipal water supplies has become standard practice in the United States and abroad. About 6% to 8% of the very considerable annual production of liquid chlorine in the United States (which attained a volume of 1,767,000 tons in 1949) is believed to be consumed by municipal, urban and suburban waterworks and otherwise in the disinfection and sterilization of potable, industrial and recreational water supplies.

The use of elemental bromine for this purpose is of much more recent origin. Beckwith and Moser (Journ. Amer. Water Works Assn., 25, 367–374, 1944) and McCarthy (Journ. Amer. Water Works Assn., 58, 55–68, 1944) indicate that a bromine concentration of 0.20 to 0.25 part per million will maintain water sterile without adversely affecting the taste thereof. Wood and Illing (Analyst, 55, 126, 1930) found that water containing Escherichia coli was rendered sterile by the presence of as little as 0.15 p. p. m. of added bromine after five minutes. (The abbreviation "p. p. m." in this specification refers to "parts per million.") Henderson (U. S. Patent 1,995,639, March 26, 1935) describes a process and device for antisepticizing (i. e. disinfecting and sterilizing) water by the use of elemental bromine in concentrations not in excess of 5.0 parts per million parts of the treated water. Henderson finds that 0.25 to 0.50 p. p. m. of bromine will give a percentage kill of B. coli in a sample of contaminated water which, when using chlorine as the sterilizing agent, requires from 1.5 to 2.0 p. p. m. of chlorine to effect. Subsequent investigations have also confirmed the fact that bromine is four to six times as effective as chlorine, on a weight basis, in the control of bacteria, fungi, yeasts, molds, algae and other microbian life, in water supplies.

Tanner and Pitner (Proceedings of the Society for Experimental Biology and Medicine, 40, 143–145, 1939) found that elemental bromine will kill non-spore-forming bacteria (such as Staphylococcus aureus, Staphylococcus albus, Escherichia coli, Eberthella typhosa, etc.) in concentrations of 0.03 to 0.25 p. p. m. in 15 to 30 seconds at room temperature. Yeasts and molds (such as Monilia albicans, a mycoderma species, a penicillium species, etc.) require 0.25 to 0.50 p. p. m. with a particularly resistant strain of Saccharomyces requiring 3.0 p. p. m. of bromine for a complete kill in 15 to 39 seconds at room temperature.

The treatment of water supplies for swimming pools, baths, natatoria, aquaria and other recreational purposes is described by Hildesheim (Techn. Gemeindeblatt 39, 56–58, 1936), by Amelung (Public Health Eng. Abstracts 17SW, 5, May 22, 1937) and in the Dow Diamond (August 1949, pp. 28–32). If such water is badly contaminated, an initial concentration of 3 to 4 p. p. m. of bromine will kill contaminating organisms after which the bromine concentrations may gradually be reduced to 0.25–0.50 p. p. m. which will maintain sterility of the water.

Bromine is highly effective in destroying all forms of fungi, algae, bacteria, protozpa, diatoms and slime-forming bacteria. Excellent control of these microorganisms can be effected with less than 0.1 p. p. m. of bromine, whereas equivalent control requires at least 0.5 p. p. m. of chlorine. In addition, bromine has a flash killing effect on these microorganisms. No evidence of acquired tolerance to bromine has yet been found. On the contrary, prolonged treatment with sublethal dosages of bromine serves to weaken the contaminating micro-organisms.

The basis of this invention is the finding that bromine chloride is an excellent sterilizing and disinfecting agent for water, surpassing both chlorine and bromine in effectiveness and economy.

Bromine chloride is an unusual chemical compound, whose formula is BrCl. It forms a reddish yellow liquid boiling at 10° C. at atmospheric pressure. Above its boiling point, bromine chloride dissociates into elemental bromine and elemental chlorine. The compound BrCl is made quite simply by adding chlorine (either as gas or liquid) to bromine, while maintaining the temperature by cooling between —7° C. and +10° C., until one gram atom of bromine has reacted with one gram atom of chlorine, i. e. until the bromine has increased in weight by 44.3%.

For some time, it was believed that this discrete chemical compound—bromine chloride— was actually a mixture of bromine and chlorine crystals (Lebeau, Comptes rendus 143, 589, 1906, Bull. soc. Chim. 35, 1161, 1906, Ann. chim. phys. 9, 475, 1906). However, its identity as a true chemical compound has been recognized and adequately confirmed by the work of Barrett and Stein (Proc. Roy. Soc. (London), A122, 582–8, 1929), Lux (Berichte 63B, 1156–8, 1930), Brauer and Victor (Zeit. Elektrochemie 41, 508–9, 1935), Jellinek and Schutza (Zeit. anorg. allgem. Chem., 227, 52–61, 1936), Vesper and Rollefson (Journ. Amer. Chem. Soc., 56, 620–5, 1934), Kanyaev and Shilev (Trans. Instit. Chem. Techn. Ivanova (USSR), 1940, No. 3, 69–73) and Butkow (Rec. trav. Chim. Pays-Bas 67, 551–562, 1948).

Bromine chloride may also be made by the reaction of bromine and chlorine in the gas phase (Jost, Zeit, physik. Chem., B14, 413–420, 1931) and by the reaction of bromine and chlorine in aqueous hydrochloric acid solution (Forbes and Fuess, Journ. Amer. Chem. Soc., 49, 142–156, 1927). From cold aqueous solutions, bromine chloride crystallizes as the orange-reddish colored tetrahydrate—BrCl.4H$_2$O (Anwar-Ullah, Journ. Chem. Soc. (London), 1932, 1176–9). It must therefore be understood that, in this specification and the appended claims, any reference to bromine chloride refers as well to the equivalent quantity of hydrated bromine chloride. Similarly, any reference to chlorine and bromine refers as well to the equivalent quantity of chlorine hydrate and bromine hydrate.

When elemental bromine is dissolved in very large quantities of water (i. e. dilutions equivalent to those encountered in the use of bromine for water-treatment), the following hydrolysis reaction occurs:

$$Br_2 + H_2O \rightleftharpoons HOBr + HBr$$

and proceeds almost entirely to the right, i. e. although the reaction is reversible, almost all of the bromine exists in solution as HOBr and HBr. The actual germicidal, bactericidal, fungicidal and algaecidal principle in these dilute solutions is neither the residual elemental bromine nor the hydrobromic acid, but actually the entire disinfecting and sterilizing action is attributable to the extremely potent hypobromous acid formed in solution. Thus, only half of the minimal amounts of bromine used is germicidally effective, since only one-half of the bromine used forms hypobromous acid (HOBr), whereas the other half of the bromine forms the relatively ineffective and germicidally inert hydrobromic acid (HBr).

I have found that when bromine chloride is dissolved in large quantities of water, the following reversible hydrolytic reaction occurs:

$$BrCl + H_2O \rightleftharpoons HOBr + HCl$$

and almost all of the bromine added as BrCl forms the highly effective germicide, bactericide, fungicide and algaecide hypobromous acid. There is little or no formation of the inert hydrobromic acid and little or no formation of the less active hypochlorous acid (HOCl). Substantially all of the bromine in the compound (instead of only one-half) is thus obtained in the germicidally active form of HOBr, while substantially all of the chlorine in the compound is obtained as the relatively inert hydrochloric acid.

Inasmuch as the activity of elemental bromine as a sterilizing and disinfecting agent for water is entirely attributable to the hypobromous acid which it forms upon hydrolysis in dilute solution, and since the degree of hydrolysis of elemental bromine and of bromine chloride in the dilute aqueous solutions in which they are used for water treatment is substantially quantitative, it can be seen that one gram/mole of BrCl (115.37 grams) will yield as much hypobromous acid as will one gram/mole of Br$_2$ (159.83 grams). Bromine chloride may therefore be expected to be almost 140% as effective as elemental bromine, on a weight basis, as a disinfecting and sterilizing agent. Actual tests indicate that the effectiveness of bromine chloride over elemental bromine as a disinfecting and sterilizing agent is considerably greater than this factor of 140%. A synergistic action (which has, however, not been completely proven as yet) is believed to be responsible for this phenomenon.

Since bromine chloride can be manufactured at a cost per pound not in excess of 70% of the cost per pound of bromine, it is obvious that the use of bromine chloride as a disinfecting and sterilizing agent for water supplies will prove no more than 50% as costly as the use of elemental bromine, and may indeed prove to be considerably more economical on a prolonged, large-scale use as, for instance, in the treatment of the municipal water supplies for the large city.

It is interesting to note that the Illinois State Department of Health questioned 54 swimming pool operators who are using bromine for the sterilization of their water supplies. Of these, 34% stated that bromine treatment of their water supplies was more economical than chlorine treatment, 27% stated that the opposite was true and 39% had no conclusive opinions. Because of the higher effectiveness of bromine, a truly borderline economic competition exists between bromine and the cheaper chlorine as an agent for water sterilization. The almost equal division of opinion above cited would seem to bear this out. The use of bromine chloride, at approximately half of the cost, or less, than that of bromine (or chlorine) will therefore offer a very marked saving to the user and represents the most economical method for disinfecting and sterilizing water supplies of every nature.

The amount of bromine chloride which is added to the water may vary widely and is by no means critical. As little as 0.02 parts per million may suffice to maintain sterility in a pure water supply, whereas as much as 10.0 parts per million may be required for the initial treatment of a contaminated water supply. A bromine chloride concentration of between 0.05 to 0.50 part per million will usually be found adequate for the control of the bacteria count in most water supplies.

The advantages of bromine chloride-treated water over chlorine-treated water are quite outstanding and may be enumerated as follows:

(1) Such BrCl-treated water is devoid of taste, odor and color, and will not irritate the swimmer's eyes, skin and mucous membranes when used in swimming pools, baths and aquaria at the maximum dosage of treatment;

(2) Unlike chlorine-treated water, BrCl-treated water retains its effectiveness as a disinfectant in the present of intense sunlight and water temperatures as high as 90° F. It is affected by sunlight only one-sixth to one-twelfth as much as is chlorine-treated water (3) Because of the flash action above referred to, water treated with bromine chloride will kill contaminating microorganisms much more rapidly than will chlorine-treated water.

(4) Aftertreatment of the BrCl-treated water with ammonia and/or activated carbon is not necessary, thus effecting a very considerable saving for the user. This is a very important economic consideration. Portable and industrial water supplies often becomes contaminated with minute traces of phenolic compounds from industrial wastes, organic putrefaction, wash-down from tar road coverings, etc., etc. On chlorinating such a water supply, these phenolic compounds form exceedingly malodorous and persistent chlorinated phenol derivatives which are objectionable even in the slightest traces. An expensive and laborious aftertreatment with ammonia and/or activated carbon is therefore necessary for adequate control of taste and odor in the water. When treated with bromine chloride, such waters containing phenolic derivatives as trace impurities will form brominated phenolic derivatives which are almost completely odorless and tasteless in the great dilution in which they are formed, and need not be further treated in order to obtain a water supply of acceptable taste and odor. Thus, aftertreatment with ammonia and/or activated carbon may be obviated with considerable savings for the user in the chemicals (often the value of the ammonia required is as great as the value of the chlorine consumed), equipment and supervisory labor.

The advantages of bromine chloride-treated water over bromine-treated water may be enumerated as follows:

(1) On a weight basis, bromine chloride is at least 140% as effective as bromine and may possibly be more so in individual instances.

(2) On a cost basis, treatment of water supplies with bromine chloride is at most 50% as expensive as treatment with bromine, and may prove to be less so in individual instances.

Bromine chloride, being liquid at 10° C., can be shipped and stored in glass bottles and (if free of moisture) in lead-lined or nickel-clad steel drums or tankcars, at atmospheric pressure or slightly above atmospheric pressure. At temperatures above 10° C., there will be sufficient internal pressure in the BrCl-containing vessel to permit the contents thereof to be transferred without difficulty. Unlike chlorine, which must be compressed prior to liquefaction and shipment, bromine chloride can be charged into its shipping containers without compression, at atmospheric pressure, if the temperature is kept below 10° C.

The bromine chloride may be added, dissolved, metered or proportioned into the water to be treated in any manner or with any device. The common drum and bottle applicator arrangements used in adding bromine to water may also be adapted for the addition of bromine chloride to the water. One of the preferred methods of obtaining a uniform solution of BrCl in the water to be treated is to divert a small portion of the total flow through a corrosion-resistant pipe or channel, where it is mixed with a quantity of bromine chloride sufficient for the entire flow, and is then fed back into the main stream, where it mixes and distributes itself by natural turbulence and yields a uniform dilution of BrCl in the treated water. This so-called Minor Flow System is standard practice in the treatment of water supplies with chlorine.

It will be obvious to any person skilled in the art that the same effect can be obtained by using a substantially equimolecular mixture of elemental bromine and elemental chlorine as can be obtained by using bromine chloride. Thus, if chlorine and bromine, in substantially equimolecular proportions, are added to the water either consecutively or concurrently (and it does not matter which halogen is added first), the halogens will react to form bromine chloride. However, if the hydrolysis process in the great dilutions involved is permitted to occur between the time one halogen or the other is added, the following may occur:

(a) If chlorine is added first:

$$Cl_2 + H_2O \rightleftharpoons HOCl + HCl$$

which, upon addition of the bromine, reacts as follows:

$$HOCl + HCl + Br_2 + H_2O \rightleftharpoons 2HOBr + 2HCl$$

(b) If the bromine is added first:

$$Br_2 + H_2O \rightleftharpoons HOBr + HBr$$

which, upon addition of the chlorine, reacts as follows:

$$HOBr + HBr + Cl_2 + H_2O \rightleftharpoons 2HOBr + 2HCl$$

Thus, the overall effect is the same whether BrCl is used, whether bromine and chlorine are added concurrently or consecutively or whether one halogen is added and the other is then added after a period of time sufficient to permit the former halogen to dissolve and hydrolyze (or react with the water). In exactly the same manner, if the bromine chloride is permitted to vaporize prior to solution in the water to be treated (in which vapor phase it is believed to exist as free bromine and free chlorine), it will effect the sterilization and disinfection of the water in exactly the same manner as will the addition of the bromine chloride as a discrete, individual chemical compound.

It must therefore be understood that substantially equimolecular proportions of bromine and chlorine, whether in the gaseous or liquid state, are the complete functional equivalent of bromine chloride in the process of the present invention, and are so claimed.

As a general rule, it will be found most feasible on a commercial scale and in the practical application of this invention, to manufacture, store, ship and use bromine chloride as an individual chemical and physical entity for the purposes of the present invention, rather than to store and ship bromine and chlorine separately and to use these conjointly as above indicated in place of bromine chloride. However, this is by no means a critical feature of this invention. The joint use of chlorine and bromine in the sterilization and disinfection of water supplies may be found preferable in some cases. This joint use of chlorine and bromine, as above indicated, is believed to be a useful and novel concept and is an integral part of this invention.

A special application of the principle of the present invention may be possible in localities accessible to sea water or to bromide-containing brines, bitterns or salt deposits, as well as on board vessels navigating salt water bodies. As is well known, the waters of the oceans contain from 40 to 70 p. p. m. of bromine (as water-soluble bromides). Various brines, bitterns and salt deposits and concentrates throughout the world may contain as much as 1.0% of combined bromine. By over-chlorinating these bromide-containing solutions with at least twice as much chlorine as is required to liberate the free bromine, preferably after first adjusting the pH of the solution to between 3.0 and 4.0, the bromide content of these saline solutions is converted to bromine chloride:

$$NaBr + Cl_2 \rightarrow NaCl + BrCl$$

$$MgBr_2 + 2Cl_2 \rightarrow MgCl_2 + 2BrCl$$

Thus, these plentiful naturally-occurring saline solutions may be used as an inexpensive source for bromine chloride. Thus, sea water containing 60 p. m. m. of bromine (as bromides) is adjusted to pH 3.5 by the addition of 10% sulfuric acid solution, and is then chlorinated with 60 p. m. m. of chlorine. The resultant solution will contain the equivalent of 86 p. p. m. of bromine chloride plus, of course, all of the other saline components of the original sea water. This concentrate of BrCl may then be diluted 170 to 1700 times with fresh water to obtain the usual concentration of 0.05 to 0.50 p. p. m. of bromine chloride in the treated water. Such great dilutions of the sea-water may permit the treated water to be used for all ordinary potable and industrial purposes, except where small amounts of electrolytes or solubles are not desirable in the water. However, for most household and kitchen uses, for swimming pools, baths, aquaria, irrigational canals, agricultural and horticultural uses, for fire-fighting, cooling systems, pulp and paper mills, etc., such water supplies containing small amounts of electrolytes and solubles may be used with safety and economy.

To test the relative efficacy of chlorine, bromine and bromine chloride for the disinfection and sterilization of water, a strain of B. coli was used as a test organism. One cubic centimeter of a heavy, 24 hour culture of this organism on nutrient broth was diluted with one liter of triple-distilled water. A bacteria count was made of this diluted culture and used as a control. To portions of this diluted culture, there were now added 0.05, 0.10, 0.15, 0.25, 0.50, 1.00, 1.50 and 2.00 p. p. m. of chlorine, bromine and bromine chloride, respectively, and, in each case, samples were diluted and plated out on Petri dishes containing nutrient agar at the expiration of 5 minutes, 10 minutes, 30 minutes and 60 minutes after the addition of the sterilizing agent. The following table indicates the percentage of the B. coli originally present which were killed in each instance:

*Percentage kills*

| Disinfecting Agent | Parts per Million of the Disinfecting Agent | | | | | | | |
|---|---|---|---|---|---|---|---|---|
| | 0.05 | 0.10 | 0.15 | 0.25 | 0.50 | 1.00 | 1.50 | 2.00 |
| | Percent | Percent | Percent | Percent | Percent | Percent | Percent | Percent |
| Chlorine: | | | | | | | | |
| 5 min | none | none | none | 10 | 60 | 88 | 98 | 100 |
| 10 min | none | none | none | 18 | 70 | 92 | 100 | 100 |
| 30 min | none | none | 5 | 30 | 74 | 88 | 100 | 100 |
| 60 min | none | none | 2 | 26 | 62 | 90 | 100 | 100 |
| Bromine: | | | | | | | | |
| 5 min | none | none | 22 | 80 | 100 | 100 | 100 | 100 |
| 10 min | none | 16 | 40 | 98 | 100 | 100 | 100 | 100 |
| 30 min | 10 | 24 | 66 | 100 | 100 | 100 | 100 | 100 |
| 60 min | 11 | 22 | 50 | 96 | 100 | 100 | 100 | 100 |
| Bromine chloride: | | | | | | | | |
| 5 min | 16 | 26 | 76 | 100 | 100 | 100 | 100 | 100 |
| 10 min | 32 | 67 | 89 | 100 | 100 | 100 | 100 | 100 |
| 30 min | 46 | 80 | 90 | 100 | 100 | 100 | 100 | 100 |
| 60 min | 38 | 80 | 98 | 100 | 100 | 100 | 100 | 100 |

The bromine chloride solutions of this invention may also be employed for other purposes heretofore filled by the use of bromine solutions (i. e. bromine water), e. g.:

(a) as a topical disinfectant in human and veterinary medicine (Schulmacher, Deutsch. med. Wochenschrift 1915, 220, Schweiz, Apoth. Zeit., 53, 281, 1915), (b) as a sterilizing agent and fungicide for stored seeds and grains (Arzichewsky and Stom, Chemiker Ztg., 36, 248 1912, Magraine, Arch. farm. sper., 44, 93–122, 1927, de Zeeuw, Expt. Stat. Rev. 26, 819, 1912, Wilson, Amer. Journ. Botan 2, 420, 1915, La Rue, Science, 1937, 85), (c) in the manufacture, shrinkproofing and feltproofing of woolen fabrics and articles (Trotman, Rev. Gen. Mater. Color., 37, 388–392, 1933), (d) as a soil-sterilizing agent (Payne, U. S. Patent 2,377,446, 1945), (e) as an agent for the partial degradation and dextrinizing of starch and related carbohydrates (Haller, Helv. chim. acta 29, 1156–1159, 1946), and (f) as a laboratory and analytical reagent, oxidizing agent, bleach, general bactericide, germicide, fungicide, algaecide, et cetera.

Having described my invention, what I claim and desire to protect by Letters Patent is:

1. A process for the sterilization and disinfection of water which comprises adding thereto from 0.02 to 10.00 parts per million of a member of the group consisting of (a) bromine chloride and (b) bromine and chlorine in substantially equimolecular proportions.

2. A process for the sterilization and disinfection of water which comprises adding thereto from 0.02 to 10.00 parts per million of bromine chloride.

3. A process for treating water with from 0.02 to 10.00 parts per million of a member of the group consisting of (a) bromine chloride and (b) bromine and chlorine in substantially equimolecular proportions.

JONAS KAMLET.

References Cited in the file of this patent

UNITED STATES PATENTS

| Number | Name | Date |
|---|---|---|
| 2,443,429 | Marks et al. | June 15, 1948 |

OTHER REFERENCES

J. Am. Waterworks Assoc., v. 25, pages 367–74, 1933.

Inorg. and Theor. Chemistry, v. 2, pp. 114–15, by Mellor, 1922.